United States Patent Office 3,210,260
Patented Oct. 5, 1965

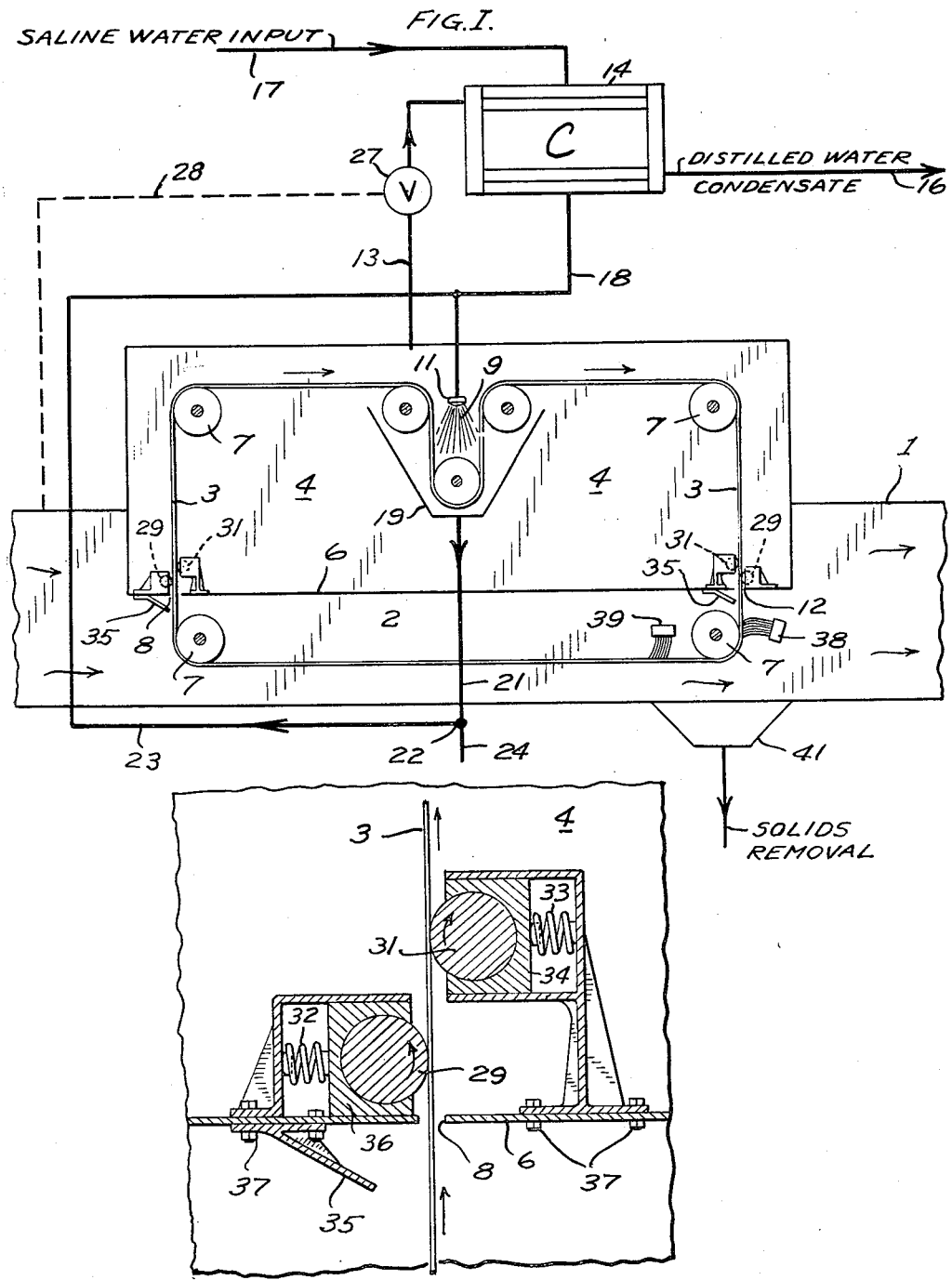

3,210,260
APPARATUS FOR DISTILLATION OF SALINE WATER TO PRODUCE FRESH WATER
Bernard L. Denker, Short Hills, N.J., and Robert A. Lorenzini, Westport, Conn., assignors to Foster Wheeler Corporation, New York, N.Y., a corporation of New York
Filed May 14, 1962, Ser. No. 194,404
4 Claims. (Cl. 202—236)

This invention relates to a heat exchanger employing a movable regenerative mass. It is a system for saline water evaporation using heat from a convenient fluid.

Relatively hot exhaust gases are common in the process industry. These gases are not usually hot enough to provide the temperature levels which industry demands for process streams.

Waste heat recovery units are frequently called upon to preheat a process stream with further temperature boosting accomplished by a fired heater. Preheating appeals to logic, but in most cases the cost of a waste heat recovery unit for preheating service must be pragmatically weighed against the obvious alternative of counterflow preheating in the flue of the fired heater itself. Confronted by such economic realities, waste heat recovery units are soon forgotten and the hot gases go out the stack.

Another approach to heat recovery from flue gases has been to employ regenerative heaters to preheat combustion air. This expedient has found favor in boilers. However, a major drawback is inherent in such arrangements. Combustion air is delivered at much higher pressures than those at which flue gas exits. So the cycling of a regenerative mass between the high pressure air conduit and a low pressure flue involves an air leakage problem which complicates sealing structures and runs up the cost of blowers. This leakage problem is highly significant both in rotating basket type as well as in endless belt type regenerative heaters.

The present advance is rooted in three recognitions:

First, there is just so much preheated combustion air that would be required reasonably in most process plants.
Second, it would be desirable to recover heat from otherwise wasted gases without being backed into the problem of high pressure gradients across seals.
Third, various factors frequently compel the location of process plants away from pure water.

Accordingly, the use of heat available in flue gases to evaporate saline water is here contemplated.

Fundamentally, this teaching takes advantage of a heat recovery opportunity.

Distillation systems offer pressure versatility. Means are available to control the pressures across the seals so that leakage gradients are virtually eliminated. Sealing then becomes simple.

Structural demands of this endless belt apparatus are far less severe than those of comparable waste heat recovery units.

Recirculation is employed to conserve heat.

These and other features will appear more fully from the accompanying drawing wherein:

FIGURE I is a schematic representation of a system embodying the invention.
FIGURE II is an enlarged sectional detail view of a seal.

Flue gas or some other suitable hot fluid passes through flue 1 which defines heating zone 2. A regenerative mass, shown as endless belt 3 is coursed by mechanical drive means (not shown) through a compartment or heating zone 2 to recover heat from the flue gas. Belt 3 can be moved to and fro for improved heat recovery. The belt here shown is a ribbon. It is apparent that a wire fabric would also be suitable.

The heated belt is used to evaporate saline or brackish water in evaporation zone 4. Belt 3 is conducted by rollers 7 through port 8 to penetrate inclosure or shell 6 passing into evaporation zone 4. In the evaporation zone the belt is contacted with preheated saline water 9 sprayed thereon by nozzles 11 to distill water vapor therefrom. Belt 3 then passes out port 12 for recirculation through heating zone 2.

Distillation is completed by condensing the water vapor. In furtherance of this objective, water vapor is passed by way of conduit 13 to a condensation zone 14, shown as a surface condenser, for liquification. Condensate exits via line 16.

Incoming saline water delivered through line 17 serves as the non-contact cooling fluid in the surface condenser and is preheated therein. Preheated saline water is then passed via line 18 to nozzle 11.

For increased surface area a plurality of evaporation and condensation zones are often provided. In such arrangements, evaporators and condensers are usually cascaded for counterflow relationship.

Water distillation is especially suited for heat recovery from flue gases because evaporators can be efficiently operated at pressures compatible with flue pressures. Leakage gradients may be eliminated. Condensation in zone 14 develops a partial vacuum which is available to naturally draw steam through conduit 13 from evaporation zone 4. In some design situations it is possible that steam removal from the evaporation zone may be inadequate, then ejectors could be employed.

Recirculation of sludge conserves heat. Sludge is the unevaporated saline water from pan 19. Sludge removal from pan 19 prevents undue salt caking on evaporator internals. Sludge is conducted from pan 19 via line 21. At juncture 22 the sludge is divided into a major portion 23 and a minor portion 24. Minor portion 24 is blown down. Major portion 23 is recycled to join preheated saline water in line 18. Having hot sludge for recirculation offers an important condenser control opportunity which can be translated into steam pressure regulation for evaporation zone 4 by available techniques.

Is is desirable to keep the pressure in evaporation zone 4 sufficiently high to prevent passage of flue gas into the evaporation zone via ports 8 and 12. In addition to regulation of the condenser, pressure control means shown as pressure regulator 27 connected in conduit 13 is available to maintain the pressure in the exaporation zone by throttling steam exhaust to condensation zone 14. A butterfly type of pressure regulation would be suitable. Pressure regulator 27 can be constructed and arranged to be operable in response to signal means shown as pilot pressure tube 28 which communicates with pressure in flue 1. By this arrangement, the inleakage gradient for harmless flue gases into exaporation zone 4 is kept down to acceptable limits. For obnoxious flue gases inleakage gradients can be eliminated completely. In this regard, pressures in evaporation zone 4 should err on the high side. Since the pressure in the evaporation section 4 is preferably higher than the pressure in the heating zone 2, outleakage of some water vapor into the flue causes only slight corrosion and rain. Whereas flue gas inleakage to the evaporation zone would pass to condensation zone 14 and foul the product.

Ports 8 and 12 are provided with seals shown in FIGURE II. Rolling seal members 29 and 31 simultaneously contact belt 3 on either side thereof. Springs 32 and 33 react against sockets 34 and 36 for engagement thrust. Bolts 37 are of vibration resistant design. The bolt holes in shell 6 are elongated to accommodate seal adjustment.

Baffles 35 serve to reduce pressure on the flue side of ports 8 and 12. As best seen in FIGURE I, the lower section of the enclosure 6 is located in the compartment 1. The ports 8 and 12 are situated in the bottom surface of the enclosure 6.

Belt 3 is mechanically cleaned by brushes 38 and 39. Solids are collected in trough 41 for removal.

It will be apparent that wide changes may be made in the details of the shown embodiment without departing from the spirit of invention defined in the claims.

What is claimed is:

1. A system for distilling fresh water from saline water, comprising:

An endless metallic belt having a first portion and a second portion, a compartment forming a heat zone having said first portion of said belt located therein, said compartment being connected to a source of hot fluid and to an exhaust for discharging said hot fluid, an enclosure forming an evaporation zone located adjacent said compartment having said second portion of said belt located therein, ports being situated between said compartment and said enclosure to permit the entrance and exit of said belt, rollers for supporting said belt, means for rotating said belt about said rollers, a condenser, a source of saline water being connected to said condenser for preheating, a supply conduit connected to said condenser, said supply conduit having a discharge end located within said evaporation zone adjacent said belt, a nozzle attached to said discharge end for delivering a spray of preheated saline water against said belt whereby a part of said saline water is vaporized leaving the remainder of the saline water as sludge, means for collecting said sludge, a drain conduit for removing said sludge, a divider for separating said sludge in a major portion and a minor portion, a recirculation conduit for returning said major portion of said sludge to said supply conduit, a blow down conduit for removing a minor portion of said sludge from circulation, and a vapor conduit for removing vapor from said evaporation zone and delivering said vapor to said condenser to condense the vapor while using the heat to preheat the saline water.

2. A system according to claim 1 including:

a seal means to prevent leakage at said ports between the enclosure and compartment, and mechanical rubbing means for cleaning said belt while it rotates.

3. A system according to claim 2 including:

a seal means to prevent leakage at said ports between the enclosure and compartment, mechanical rubbing means for cleaning said belt while it rotates, and means for maintaining the pressure in the enclosure in excess of the pressure in the compartment.

4. A system for distilling fresh water from saline water, comprising:

an endless metallic belt having a first portion and a second portion;

a compartment forming a heat zone having said first portion of said belt located therein, said compartment being connected to a source of hot fluid and to an exhaust for discharging said hot fluid;

an enclosure forming an evaporation zone having said second portion of said belt located therein, said enclosure having a lower section with a bottom surface located within said compartment, ports being situated in said bottom surface between said compartment and said enclosure to permit the entrance and exit of said belt;

rollers for supporting said belt;

means for rotating said belt about said rollers;

a condenser, a source of saline water being connected to said condenser for preheating;

a supply conduit connected to said condenser, said supply conduit having a discharge end located within said evaporation zone adjacent said belt for delivering a stream of preheated saline water against said belt whereby a part of said saline water is vaporized leaving the remainder of the saline water as sludge;

means for collecting the sludge;

a drain conduit communicating with said sludge collecting means for removing said sludge, and a conduit connected to said evaporation zone and delivering the vapor from said evaporation zone to said condenser to condense the vapor while using the heat to preheat the saline water.

References Cited by the Examiner

UNITED STATES PATENTS

| | | | |
|---|---|---|---|
| 239,722 | 4/81 | Cadwell | 159—7 X |
| 645,790 | 3/00 | Conover. | |
| 853,260 | 5/07 | Pasaburg | 159—7 |
| 1,015,262 | 1/12 | Campbell | 159—9 X |
| 1,286,538 | 12/18 | Coleman | 159—7 |
| 2,270,182 | 1/42 | Collings et al. | 202—64 X |
| 2,882,693 | 4/59 | Clay | 202—160 X |
| 2,959,524 | 11/60 | Goeldner. | |
| 2,976,224 | 3/61 | Gilliand. | |
| 2,989,026 | 6/61 | Gardner et al. | 34—242 X |
| 3,006,818 | 10/61 | Lappals et al. | |
| 3,032,482 | 5/62 | Shoemaker. | |
| 3,075,891 | 1/63 | Elam. | |
| 3,111,461 | 11/63 | Hickman | 202—72 X |
| 3,158,507 | 11/64 | Alexander | 34—242 X |

FOREIGN PATENTS

| | | |
|---|---|---|
| 251,895 | 5/26 | Great Britain. |
| 765,384 | 1/57 | Great Britain. |

ROBERT F. BURNETT, *Primary Examiner.*

NORMAN YUDKOFF, *Examiner.*

UNITED STATES PATENT OFFICE
CERTIFICATE OF CORRECTION

Patent No. 3,210,260            October 5, 1965

Bernard L. Denker et al.

It is hereby certified that error appears in the above numbered patent requiring correction and that the said Letters Patent should read as corrected below.

Column 1, line 66, after "through" insert -- a compartment or --; line 68, for "coursed" read -- moved --; same column 1, line 69, strike out "a compartment or --; column 2, lines 49 and 56, for "exaporation", each occurrence, read -- evaporation --.

Signed and sealed this 17th day of May 1966.

(SEAL)
Attest:

ERNEST W. SWIDER
Attesting Officer

EDWARD J. BRENNER
Commissioner of Patents